J. A. SHARP & R. B. JOHNSTON.
BALING PRESS.
APPLICATION FILED FEB. 8, 1912.
1,027,360.
Patented May 21, 1912.
2 SHEETS—SHEET 2.
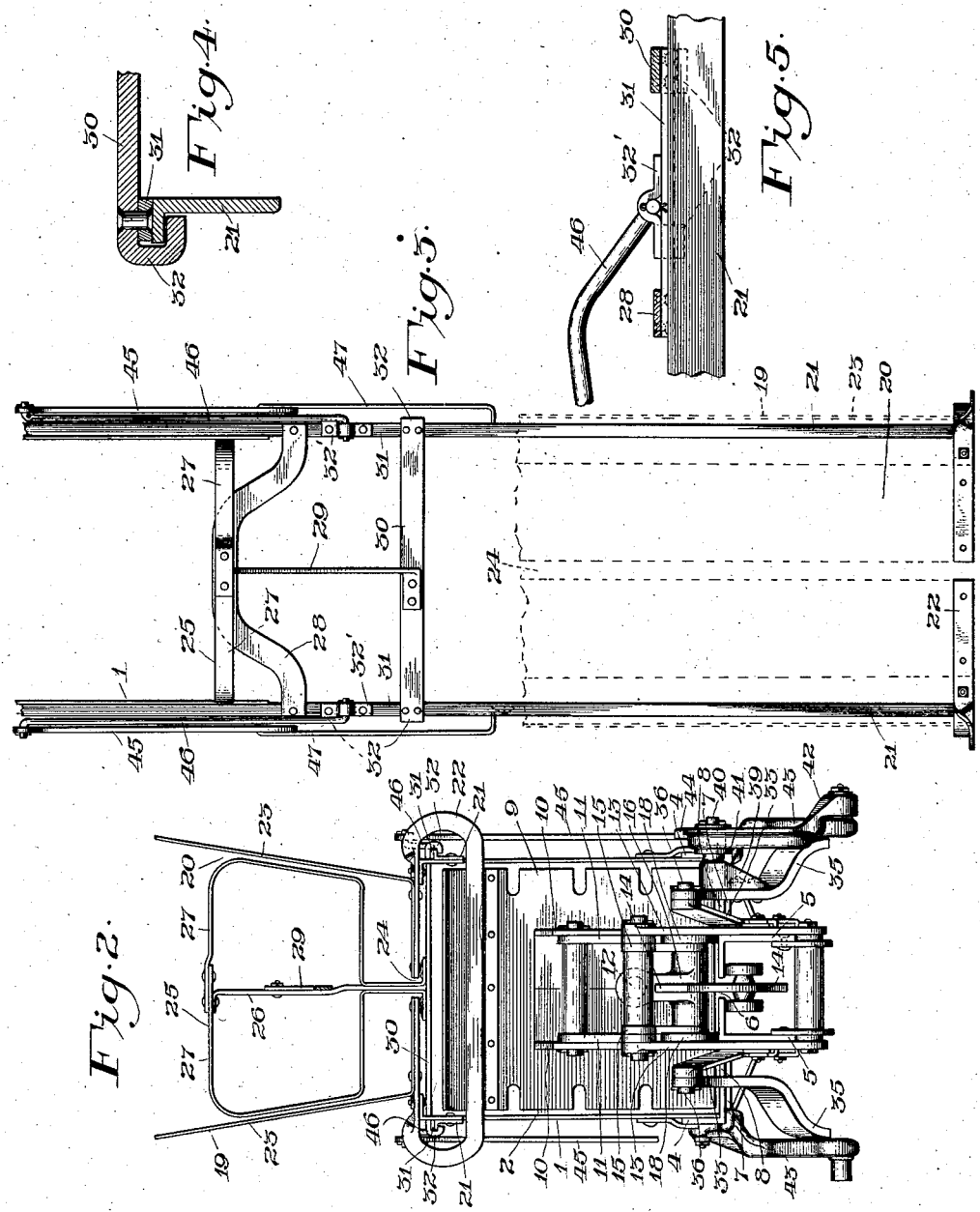
Witnesses:
F. W. Hoffmeister.
C. C. Palmer.
Inventors:
James A. Sharp
and
Roy B. Johnston.
By C. W. Burgess
Attorney.
COLUMBIA PLANOGRAPH CO., WASHINGTON, D. C.

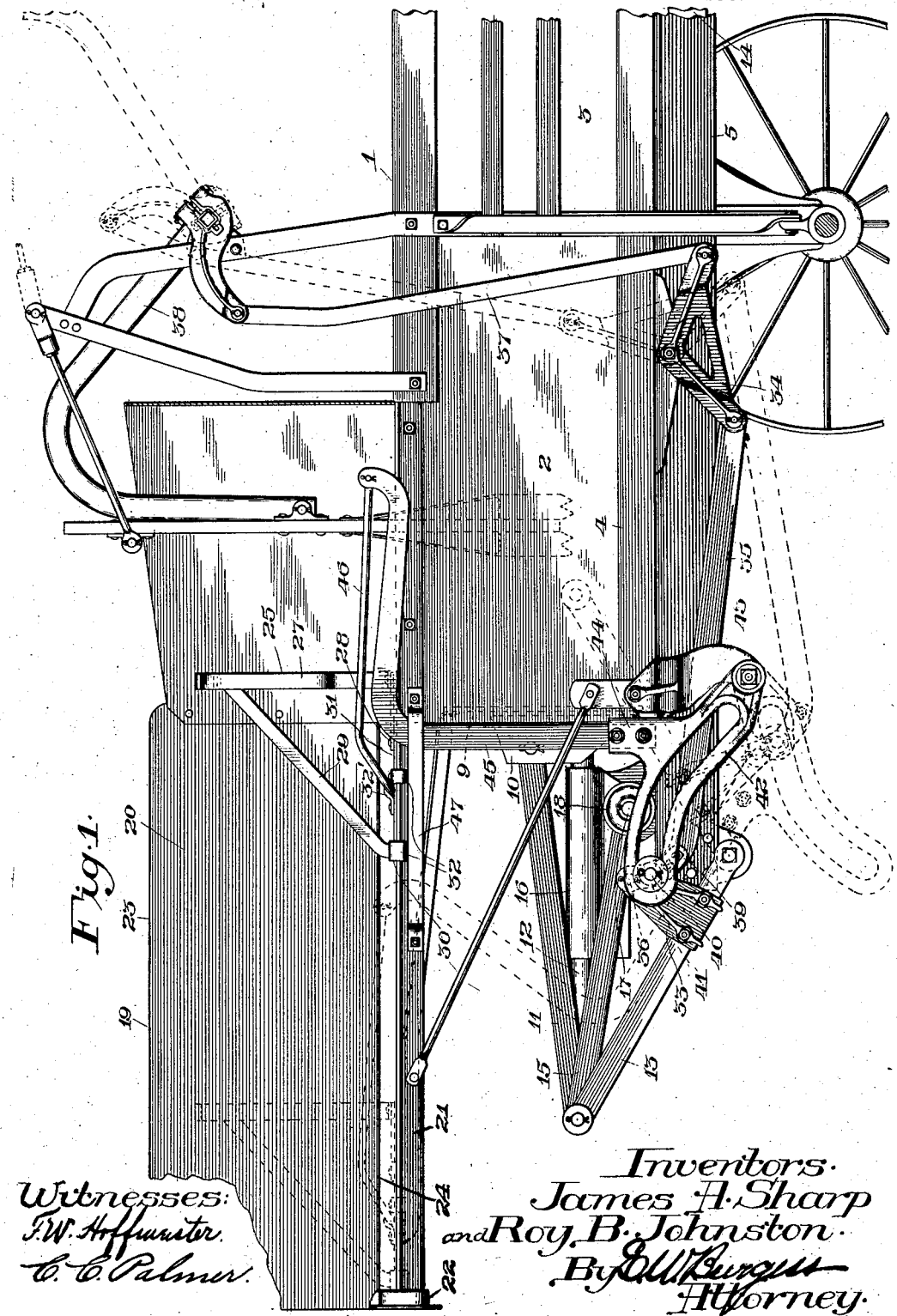

UNITED STATES PATENT OFFICE.

JAMES A. SHARP AND ROY B. JOHNSTON, OF SPRINGFIELD, OHIO.

BALING-PRESS.

1,027,360. Specification of Letters Patent. Patented May 21, 1912.

Application filed February 8, 1912. Serial No. 676,243.

*To all whom it may concern:*

Be it known that we, JAMES A. SHARP and ROY B. JOHNSTON, citizens of the United States, residing at Springfield, in the county of Clark and State of Ohio, have invented certain new and useful Improvements in Baling-Presses, of which the following is a specification.

Our invention relates to baling presses having reciprocating plungers and condensers, and in particular to means whereby the reciprocating condenser is actuated by means of a connection between the plunger actuating means and the condenser mechanism; the object of our invention being to provide a construction simple and strong in its parts and positive and efficient in operation. These objects are attained by means of the mechanism illustrated by the accompanying drawings, in which Figure 1 represents a side elevation of part of a baling press having our invention embodied in its construction; Fig. 2 is an end elevation of Fig. 1; Fig. 3 is a top plan view of the condenser; Fig. 4 is a sectional detail of part of the condenser mechanism, designed to illustrate the connection between the sliding head and the bed frame; and Fig. 5 represents a sectional detail of the condenser mechanism and designed to illustrate the manner of connecting the actuating pitmen with the sliding condenser head.

Like reference numerals designate the same parts throughout the several views.

Our invention is adapted to be connected with a plunger actuating mechanism, as is shown in Patent No. 836,653, November 20, 1906, F. A. Ryther, and 1 represents the frame of the baler, 2 the compression chamber at the rear end thereof, and 3 the baling chamber. The bottom of the frame is formed of the corner angle bars 4, the centrally arranged inverted opposing angle bars 5 spaced apart in a manner forming an inverted channel with a slot 6 in the bottom thereof, and the plate 7 and angle bars 8, which support and secure together the bars 4 and 5.

The plunger head consists of the single plate 9. At the center of the plate is secured a pair of bracket members 10, spaced apart and pivotally receiving one end of a plunger bar 11, and near the bottom of the plunger head, directly beneath the bar 11, is secured a rearwardly projecting stem 12. The opposite end of the plunger bar 11 is pivotally connected with one end of oppositely disposed toggle bars 13, having the opposite ends thereof pivotally connected with the rear end of the frame of the machine, constituting a toggle connection between the baler frame and the plunger head. A plunger draw bar 14 extends forwardly beneath the baler frame and has one end thereof connected with the toggle joint formed by the bar 11 and the toggle bars 13 by means of oppositely disposed links 15. The rear end of the draw bar is secured to a guide block 16, which is provided with a longitudinally arranged bore adapted to slidably receive the stem 12 of the plunger head. The pin 17 that secures the draw bar to the guide block is preferably made to constitute the pivotal axis of rollers 18 as well as the pivotal axis between the end of the draw bar and the links 15. The rollers 18 move along the upper side of the bars 5 and support the plunger head.

Extending in rear of the compression chamber, at the upper side thereof and in line with the feed hopper 19, is arranged a condensing chamber 20 comprising longitudinally arranged side frame members that are preferably formed of angle bars 21, a cross tie member 22 connecting the rear ends of the bars 21, and side walls 23 that incline inward and downward and then are turned in a transverse direction, forming a bottom for the chamber secured to the cross tie 22. The bottom sections are spaced apart forming a central longitudinal slot 24 extending throughout the length of the chamber.

25 represents a sliding condenser head comprising a plate member 26 secured to frame members 27 that conform to a cross section of the chamber and have the lower ends thereof secured to a cross tie member 28, the plate being further supported by means of brace member 29, having the upper end thereof secured to the head and the lower end secured to a cross tie member 30. The two cross tie members 28 and 30 have opposite ends thereof secured to longitudinally arranged bars 31 that are adapted to slide upon the frame members 21, the ends of the cross tie member 30 being made in the form of hooks 32 that engage with the lower surface of the horizontal webs of the members 21 in a manner to retain the head in proper relation with the chamber. Bracket members $32^1$ are secured to the bars 31, intermediate their ends, having hooks precisely the same as hooks 32 and serve the same purpose.

33 represents bracket members secured to the lower ends of the toggle bars 13 adjacent the pivotal connection thereof with the frame of the machine upon opposite sides thereof.

34 represents bell crank levers pivotally connected with the frame of the machine upon opposite sides of the compression chamber, and near the front end thereof, one arm of the lever being connected, by means of the links 35, with pivot pins 36 carried by the bracket members 33, the remaining arm of said lever being connected, by means of links 37, with a self-feeder mechanism 38. Secured to the rear ends of the links 35, near the connection thereof with the pins 36, are bracket members 39, having laterally projecting studs 40, upon which are journaled rollers 41 that are received by slotted cam levers 42, having one end thereof pivotally connected with the lower ends of depending bracket members 43 secured to opposite sides of the frame of the machine. The cam levers are provided with web portions 44, to which are secured the lower ends of curved bars 45, having their upper ends turned forward in a longitudinal direction upon opposite sides of the machine, and the front ends thereof connected with the sliding condenser head by means of pitmen 46, and 47 represents guides for the bars 45 that are secured to the condenser frame members 21.

In operation power is applied to the draw bar 14 and, through the connection thereof with the toggle mechanism as described, the plunger head is caused to traverse the length of the compression chamber on its opposing stroke. As the toggle members 13 swing upward and forward about their pivotal connection they carry with them the bracket members 33, and the rear ends of links 35 and rollers 41 carried by said links, swing the slotted cam levers downward, swinging the bars 45 rearward, and through the connection of said bars with the condenser head, cause the latter to slide to the rear end of the condensing chamber, and as the plunger head is returning to its initial position the slotted cams cause the condenser head to move toward the feed hopper.

What we claim as our invention, and desire to secure by Letters Patent, is:

1. A baling press having, in combination, a feed hopper, a compression chamber, a plunger head, a draw bar, means whereby said draw bar is operatively connected with said plunger head, said means including toggle bars pivotally connected with the frame of the machine, a condenser including a longitudinally arranged chamber communicating with said feed hopper, and a slidable head mounted in said chamber, means for actuating said head, said means including bracket members secured to said toggle bars, slotted cam levers pivotally connected with the frame of the machine upon opposite sides thereof, rollers carried by said bracket members and engaging with said slotted cam levers, arms having the lower ends thereof secured to said cam levers, the opposite ends of said arms being curved toward said compression chamber and connected with said slidable condenser head by means of pitmen.

2. A baling press having, in combination, a feed hopper, a compression chamber, a plunger head, a draw bar, means whereby said draw bar is operatively connected with said plunger head, said means including toggle bars pivotally connected with the frame of the machine, a condenser including a longitudinally arranged chamber communicating with said feed hopper, and a slidable head mounted in said chamber, means for actuating said head, said means including bracket members secured to said toggle bars, a self-feeder mechanism including bell crank levers pivotally mounted upon the frame of the machine upon opposite sides thereof, links pivotally connecting one arm of said bell crank levers with said bracket members, bracket members secured to said links adjacent the pivotal connection thereof with said first mentioned bracket members and having laterally projecting studs, rollers journaled upon said studs, slotted cam levers pivotally connected with the frame of the machine and receiving said rollers, arms secured to said cam levers and extending upward and forward, pitmen connecting said arms with said slidable condenser head, and longitudinally arranged guides secured to the condenser frame and engaging with said arms.

JAMES A. SHARP.
ROY B. JOHNSTON.

Witnesses:
CHAS. L. NISSLEY,
R. M. HALLENBECK.

---

Copies of this patent may be obtained for five cents each, by addressing the "Commissioner of Patents, Washington, D. C."